US008571583B2

(12) United States Patent
Tontinuttananon et al.

(10) Patent No.: US 8,571,583 B2
(45) Date of Patent: Oct. 29, 2013

(54) TRACKING AREA MANAGEMENT METHOD AND APPARATUS FOR LONG TERM EVOLUTION TELECOMMUNICATION SYSTEMS

(75) Inventors: Channarong Tontinuttananon, Richardson, TX (US); Carlos Molina, Plano, TX (US); Haibo Qian, Plano, TX (US); Michael Brown, McKinney, TX (US)

(73) Assignee: Apple Inc., Cupertino, CA (US)

( * ) Notice: Subject to any disclaimer, the term of this patent is extended or adjusted under 35 U.S.C. 154(b) by 267 days.

(21) Appl. No.: 13/147,943

(22) PCT Filed: Feb. 5, 2010

(86) PCT No.: PCT/US2010/023341
§ 371 (c)(1),
(2), (4) Date: Aug. 4, 2011

(87) PCT Pub. No.: WO2010/091266
PCT Pub. Date: Aug. 12, 2010

(65) Prior Publication Data
US 2011/0294524 A1    Dec. 1, 2011

Related U.S. Application Data

(60) Provisional application No. 61/150,499, filed on Feb. 6, 2009.

(51) Int. Cl.
*H04W 68/00*     (2009.01)
(52) U.S. Cl.
USPC ........ 455/458; 455/456.1; 455/453; 455/445; 455/440; 455/434

(58) Field of Classification Search
USPC .............. 455/458, 456.1, 453, 445, 440, 434
See application file for complete search history.

(56) References Cited

U.S. PATENT DOCUMENTS

| 6,112,097 | A | 8/2000 | Subhankar | |
|---|---|---|---|---|
| 2008/0220782 | A1* | 9/2008 | Wang et al. | 455/436 |
| 2009/0042575 | A1* | 2/2009 | Voyer et al. | 455/436 |
| 2009/0170527 | A1* | 7/2009 | Liu | 455/456.1 |
| 2010/0128621 | A1* | 5/2010 | Hamabe et al. | 370/252 |

OTHER PUBLICATIONS

International Search Report issued in PCT/US2010/023341; issued Jun. 7, 2010.

(Continued)

*Primary Examiner* — Wayne Cai
*Assistant Examiner* — Chuck Huynh
(74) *Attorney, Agent, or Firm* — Meyertons, Hood, Kivlin, Kowert & Goetzel, P.C.

(57) ABSTRACT

An MME keeps track of network tracking mobility characteristics by periodically updating a TA transition probability matrix derived from a global table that maintains UE movement data in the network by noting current TA and most recently known previous TA of each EU for every TAU event and paging event. The MME also maintains data of the number of paging events and TAUs performed by each UE and stores a paging ratio versus TAU for each UE. The UE characteristics, UE paging ratio, and network mobility characteristic are utilized in an algorithm that constructs a TA list for each UE designed to minimize the overall traffic cost function for paging events and TAU events for that UE and the overall network. Optionally, the TA list for each EU is constrained to meet certain minimum performance characteristics such as a predetermined paging success rate target and/or a predetermined delay bound target.

21 Claims, 6 Drawing Sheets

(56) References Cited

OTHER PUBLICATIONS

"Collecting mobility statistics in support of configuration and optimisation of LTE/SAE networks;" Mitsubishi Electric, 3GPP TSG RAN WG3 Meeting #55bis, St. Julian's, Malta, Mar. 27-30, 2007, R3-070660, XP002580723, retrieved from <http://www.3gpp.org/ftp/tsg_ran/WG3_lu/TSGR3_55bis/Docs/R3-070660.zip>; pp. 1-3.

"Self-optimization of assigned TA list from reported list of last visited TAs;" Mitsubishi Electric, 3GPP Draft: S2-073219, 3rd Generation Partnership Project (3GPP) TSG SA WG2 Meeting #59, Aug. 2007; pp. 1-5.

International Search Report in related Application No. PCT/US2010/023341, Jun. 7, 2010, pp. 1-3.

* cited by examiner

FIGURE 1

|    | 1   | 2   | 3   | 4   | 5   | 6   | 7   | 8   | 9   | 10  | 11  | 12  |
|----|-----|-----|-----|-----|-----|-----|-----|-----|-----|-----|-----|-----|
| 1  | 20  | 123 | 322 | 345 | 23  | 2   | 0   | 1   | 0   | 0   | 0   | 0   |
| 2  | 340 | 2   | 367 | 30  | 0   | 2   | 3   | 340 | 0   | 0   | 0   | 0   |
| 3  | 193 | 299 | 9   | 492 | 29  | 328 | 299 | 198 | 18  | 12  | 2   | 0   |
| 4  | 320 | 29  | 387 | 0   | 0   | 2   | 19  | 411 | 0   | 0   | 1   | 0   |
| 5  | 2   | 327 | 32  | 0   | 7   | 398 | 2   | 0   | 317 | 17  | 0   | 10  |
| 6  | 0   | 187 | 489 | 0   | 287 | 5   | 386 | 2   | 302 | 203 | 23  | 0   |
| 7  | 0   | 0   | 129 | 3   | 0   | 186 | 4   | 374 | 12  | 303 | 293 | 0   |
| 8  | 0   | 0   | 213 | 289 | 0   | 2   | 430 | 89  | 0   | 0   | 1   | 102 |
| 9  | 0   | 0   | 3   | 0   | 402 | 389 | 12  | 0   | 47  | 123 | 0   | 343 |
| 10 | 0   | 0   | 12  | 0   | 8   | 423 | 232 | 12  | 332 | 2   | 293 | 0   |
| 11 | 0   | 0   | 9   | 0   | 0   | 42  | 357 | 39  | 1   | 402 | 0   | 13  |
| 12 | 0   | 0   | 1   | 1   | 0   | 2   | 98  | 449 | 0   | 0   | 389 | 443 |

| | 1 | 2 | 3 | 4 | 5 | 6 | 7 | 8 | 9 | 10 | 11 | 12 |
|---|---|---|---|---|---|---|---|---|---|---|---|---|
| 1 | 0.41 (4) | 0.39 (3) | 0.15 (2) | 0.03 (5) | 0.02 (1) | 0.00 (6) | 0.00 (7) | 0.00 (8) | 0.00 (9) | 0.00 (10) | 0.00 (11) | 0.00 (12) |
| 2 | 0.34 (3) | 0.31 (1) | 0.31 (8) | 0.03 (4) | 0.00 (7) | 0.00 (2) | 0.00 (5) | 0.00 (6) | 0.00 (9) | 0.00 (10) | 0.00 (11) | 0.00 (12) |
| 3 | 0.26 (4) | 0.17 (6) | 0.16 (2) | 0.16 (7) | 0.11 (8) | 0.10 (1) | 0.01 (9) | 0.02 (5) | 0.01 (10) | 0.00 (3) | 0.00 (11) | 0.00 (12) |
| 4 | 0.35 (8) | 0.33 (3) | 0.27 (1) | 0.02 (2) | 0.02 (7) | 0.01 (12) | 0.00 (11) | 0.00 (6) | 0.00 (4) | 0.00 (5) | 0.00 (9) | 0.00 (10) |
| 5 | 0.36 (6) | 0.30 (2) | 0.29 (9) | 0.03 (3) | 0.02 (10) | 0.01 (5) | 0.00 (7) | 0.00 (1) | 0.00 (4) | 0.00 (8) | 0.00 (12) | 0.00 (11) |
| 6 | 0.26 (3) | 0.20 (7) | 0.16 (9) | 0.15 (5) | 0.11 (10) | 0.10 (2) | 0.00 (6) | 0.01 (11) | 0.00 (8) | 0.00 (1) | 0.00 (4) | 0.00 (12) |
| 7 | 0.27 (8) | 0.22 (10) | 0.21 (11) | 0.13 (6) | 0.09 (3) | 0.07 (12) | 0.00 (7) | 0.01 (9) | 0.00 (4) | 0.00 (1) | 0.00 (2) | 0.00 (5) |
| 8 | 0.31 (7) | 0.25 (12) | 0.21 (4) | 0.16 (3) | 0.07 (8) | 0.00 (6) | 0.00 (1) | 0.00 (11) | 0.00 (2) | 0.00 (5) | 0.00 (9) | 0.00 (10) |
| 9 | 0.41 (5) | 0.40 (6) | 0.13 (10) | 0.05 (9) | 0.01 (7) | 0.00 (3) | 0.00 (2) | 0.00 (1) | 0.00 (4) | 0.00 (8) | 0.00 (11) | 0.00 (12) |
| 10 | 0.32 (6) | 0.25 (9) | 0.22 (11) | 0.17 (7) | 0.01 (12) | 0.01 (3) | 0.01 (5) | 0.01 (8) | 0.00 (10) | 0.00 (1) | 0.00 (2) | 0.00 (4) |
| 11 | 0.34 (12) | 0.31 (10) | 0.28 (7) | 0.03 (6) | 0.03 (8) | 0.01 (3) | 0.00 (1) | 0.00 (9) | 0.00 (2) | 0.00 (4) | 0.00 (5) | 0.00 (11) |
| 12 | 0.47 (8) | 0.41 (11) | 0.10 (7) | 0.01 (12) | 0.00 (6) | 0.00 (3) | 0.00 (1) | 0.00 (4) | 0.00 (2) | 0.00 (5) | 0.00 (9) | 0.00 (10) |

|  | 1 | 2 | 3 | 4 | 5 | 6 | 7 | 8 | 9 | 10 | 11 | 12 |
|---|---|---|---|---|---|---|---|---|---|---|---|---|
| 1 | 0.02 (1) | 0.41 (4) | 0.39 (3) | 0.15 (2) | 0.03 (5) | 0.00 (6) | 0.00 (7) | 0.00 (8) | 0.00 (9) | 0.00 (10) | 0.00 (11) | 0.00 (12) |
| 2 | 0.00 (2) | 0.34 (3) | 0.31 (1) | 0.31 (8) | 0.03 (4) | 0.00 (7) | 0.00 (5) | 0.00 (6) | 0.00 (9) | 0.00 (10) | 0.00 (11) | 0.00 (12) |
| 3 | 0.00 (3) | 0.26 (4) | 0.17 (6) | 0.16 (2) | 0.16 (7) | 0.11 (8) | 0.02 (5) | 0.10 (1) | 0.01 (9) | 0.01 (10) | 0.00 (11) | 0.00 (12) |
| 4 | 0.00 (4) | 0.35 (8) | 0.33 (3) | 0.27 (1) | 0.02 (2) | 0.02 (7) | 0.00 (6) | 0.01 (12) | 0.00 (11) | 0.00 (5) | 0.00 (9) | 0.00 (10) |
| 5 | 0.01 (5) | 0.36 (6) | 0.30 (2) | 0.29 (9) | 0.03 (3) | 0.02 (10) | 0.00 (7) | 0.00 (1) | 0.00 (4) | 0.00 (8) | 0.00 (12) | 0.00 (11) |
| 6 | 0.00 (6) | 0.26 (3) | 0.20 (7) | 0.16 (9) | 0.15 (5) | 0.11 (10) | 0.01 (11) | 0.10 (2) | 0.00 (8) | 0.00 (1) | 0.00 (4) | 0.00 (12) |
| 7 | 0.00 (7) | 0.27 (8) | 0.22 (10) | 0.21 (11) | 0.13 (6) | 0.09 (3) | 0.01 (9) | 0.07 (12) | 0.00 (4) | 0.00 (1) | 0.00 (2) | 0.00 (5) |
| 8 | 0.07 (8) | 0.31 (7) | 0.25 (12) | 0.21 (4) | 0.16 (3) | 0.00 (6) | 0.01 (1) | 0.00 (11) | 0.00 (2) | 0.00 (5) | 0.00 (9) | 0.00 (10) |
| 9 | 0.05 (9) | 0.41 (5) | 0.40 (6) | 0.13 (10) | 0.01 (7) | 0.00 (3) | 0.01 (2) | 0.00 (1) | 0.00 (4) | 0.00 (8) | 0.00 (11) | 0.00 (12) |
| 10 | 0.00 (10) | 0.32 (6) | 0.25 (9) | 0.22 (11) | 0.17 (7) | 0.01 (12) | 0.00 (8) | 0.01 (3) | 0.01 (5) | 0.00 (1) | 0.00 (2) | 0.00 (4) |
| 11 | 0.00 (11) | 0.34 (12) | 0.31 (10) | 0.28 (7) | 0.03 (6) | 0.03 (8) | 0.01 (9) | 0.01 (3) | 0.00 (1) | 0.00 (2) | 0.00 (4) | 0.00 (5) |
| 12 | 0.01 (12) | 0.47 (8) | 0.41 (11) | 0.10 (7) | 0.00 (6) | 0.00 (3) | 0.00 (1) | 0.00 (4) | 0.00 (2) | 0.00 (5) | 0.00 (9) | 0.00 (10) |

TRACKING AREA MANAGEMENT METHOD AND APPARATUS FOR LONG TERM EVOLUTION TELECOMMUNICATION SYSTEMS

CROSS REFERENCE TO RELATED APPLICATIONS

This application is the U.S. national phase of PCT/US2010/023341, filed Feb. 5, 2010, which claims priority to U.S. provisional application No. 60/150,499 filed on Feb. 6, 2009, which is fully incorporated herein by reference.

FIELD OF THE INVENTION

The invention pertains to tracking area management in long term evolution telecommunication systems.

BACKGROUND OF THE INVENTION

The third generation partnership project (3GPP) has developed a specification for advancements in wireless telecommunication systems commonly known as Long Term Evolution or LTE. LTE has many improvements and advancements over the previous generations of wireless telecommunication networks and systems. Among them is dynamic tracking area management. Particularly, user equipment (UE) such as cell phones, laptop computers, wireless personal digital assistants, etc. are, by definition mobile and can move between cells over time. Accordingly, wireless communication networks typically have a technique or protocol for maintaining data on the locations of the user equipment for that network.

The LTE specification sets forth a protocol for maintaining data as to the locations of UEs on the network. Particularly, LTE provides for dynamic management of UE locations.

In this specification, a basic knowledge of LTE is assumed. In LTE, a UE interfaces to the network through an evolved node B (eNB). A Mobility Management Entity (MME) in the main signaling node in the network is responsible for initiating paging and authentication of UEs. It also maintains the location information of the UEs.

LTE introduces the concept of tracking areas (TAs). A tracking area is a subset of the volume of space within the wireless network in which any given UE may be located. A tracking area may comprise the area covered by one eNB (e.g., a cell) or multiple eNBs (multiple cells).

In accordance with the LTE specification, when a UE is idle (e.g., not in active communication over the network, such as on an active telephone call) the location of the UE is known at the MME on a granularity at the TA level. Each UE maintains a tracking area (TA) list which may comprise one or more TAs within which the UE is likely to be located. Only when the UE leaves the area covered by the TAs in its TA list does the UE initiate a tracking area update (TAU) operation to notify the MME of its new location. In response to a TAU, the MME typically returns an updated TA list to the UE.

In short, the tracking area update is a communication between the UE and the MME (e.g., through an eNB) informing the MME of the new tracking area of the UE. The MME also may transmit data to the UE in connection with tracking area management.

When a call is made to a UE (e.g., a voice call to a cellular telephone), the UE is paged by the network in the TAs in its last known assigned TA list. Consequently, if the UEs in a network tend to have larger TA lists, then the TAU traffic level should tend to be relatively low, but the paging traffic level should tend to be relatively higher. Particularly, the larger the number of TAs in the list, the more likely the UE will stay within the area covered by the TAs in its TA list. Therefore, it will need to perform TAUs less often. On the other hand, if the TA lists are kept relatively smaller, then there should be greater TAU traffic, but lesser paging traffic. Particularly, if a UE's TA list is small, then it is relatively more likely to leave the area covered by the TAs in the TA list, and, therefore, will need to perform TAUs more often. Further, because the number of TAs in the list is small, every time the UE is paged by the network, there are fewer TAs in which it potentially must be paged before it is located, thus tending to reduce paging traffic.

Prior generation wireless network technologies such as GSM (Global System for Mobile communication) utilized static routing area or location area management mechanisms, which presented a complex offline network design problem. Furthermore, even if well-engineered at the time of network design, changing network mobility characteristics over time during the operating lifetime of the network could quickly render the network design less than optimal for the given usage of the network. In addition, such static tracking area management mechanisms cannot be adapted to produce the optimal signaling load results for each individual UE. Therefore, regardless of changes in network mobility characteristics, the performance of a static tracking area management mechanism is still inferior to a dynamic tracking area management approach such as enabled by LTE.

SUMMARY OF THE INVENTION

In accordance with the invention, an MME keeps track of the network tracking mobility characteristic by periodically updating a TA transition probability matrix, which is derived from a global table that maintains data of UE movement in the network by noting the current TA and most recently known previous TA of each UE for every TAU event and paging event. The MME also maintains data as to the number of paging events and TAUs performed by each UE and stores a paging ratio (the ratio of pages versus TAUs) for each UE. The UE characteristics, UE paging ratio, and network mobility characteristic are utilized in an algorithm that constructs a TA list for each UE designed to minimize the total traffic cost function for paging events and TAU events for that UE and for the overall network. Optionally, the TA list for each EU may be constrained to meet certain minimum performance characteristics such as a predetermined paging success rate target and/or a predetermined delay bound target.

DETAILED DESCRIPTION OF THE EMBODIMENTS

Figure 1:
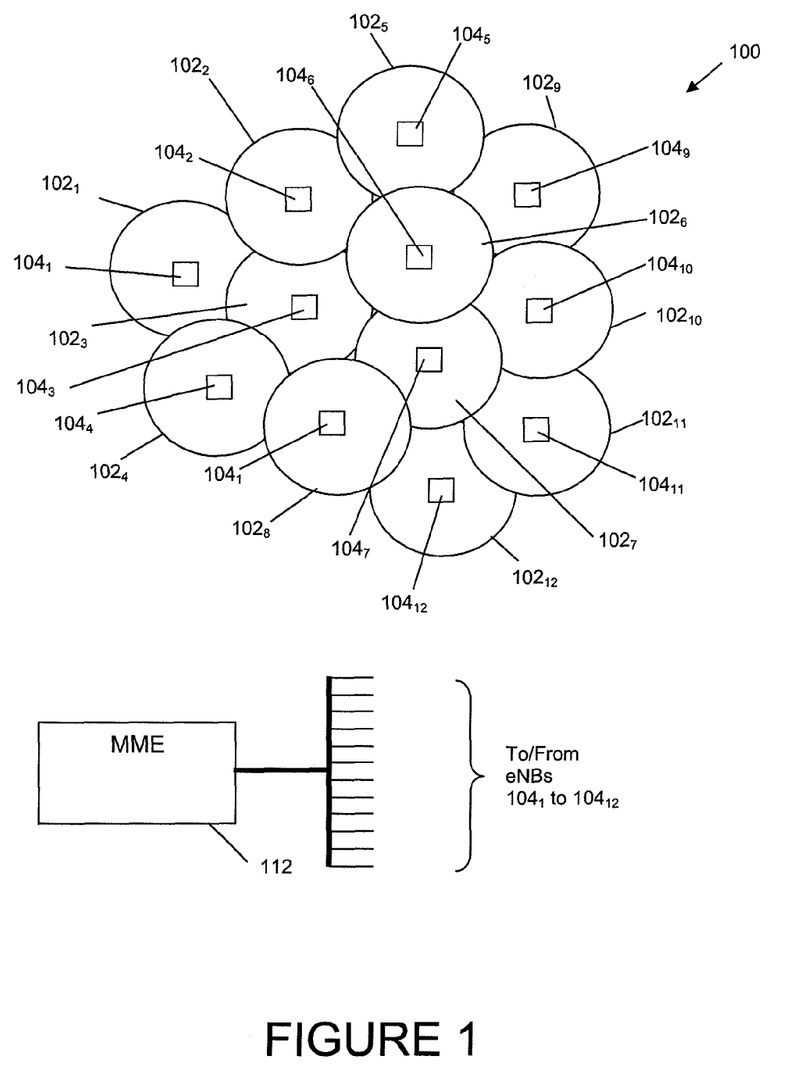
FIG. 1 is a conceptual diagram of a LTE network comprising a plurality of tracking areas.

FIG. 1 is a basic diagram of an exemplary LTE network comprising twelve eNBs $104_1$-$104_{12}$, each having an approximately circular coverage zone (or cell) $102_1$-$102_{12}$ surrounding it. As is typical, there is some overlap between the cells so that users can travel between cells without a loss of service or drop in quality of service. The network further comprises an MME 112 in communication with the eNBs. Of course, there are many other components to the network system 100. However, the Figure illustrates only the components most significant to the discussion herein. Furthermore, the communication links between the MME and each of the eNBs is abbreviated in the Figure so as not to obfuscate the illustration.

In any event, each eNB $104_1$-$104_{12}$ can communicate with the MME 112 in order to exchange network management information, including information such as tracking area lists, UE locations, etc. For purposes of simplifying this discussion, we shall assume that each zone $102_1$-$102_{12}$ corresponding to an eNB $104_1$-$104_{12}$ is a tracking area (TA). However, as previously noted, the invention can be applied in a network in which the tracking areas comprised multiple eNBs 104.

As noted above, in an LTE network, each UE maintains a TA list comprised of one or more TAs in which it is registered. Furthermore, each time it enters a TA not in its TA list, it executes a TAU.

Figure 2:
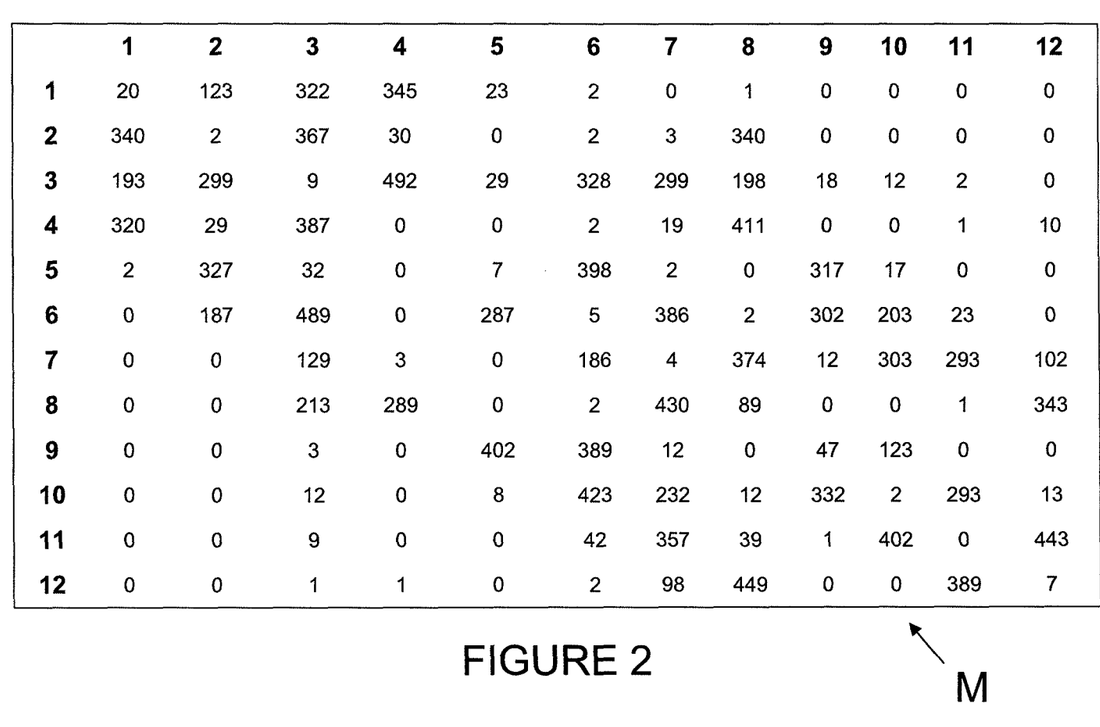
FIG. 2 is a diagram illustrating a transition probability matrix, M, in accordance with the principals of the present invention.
Figure 3:
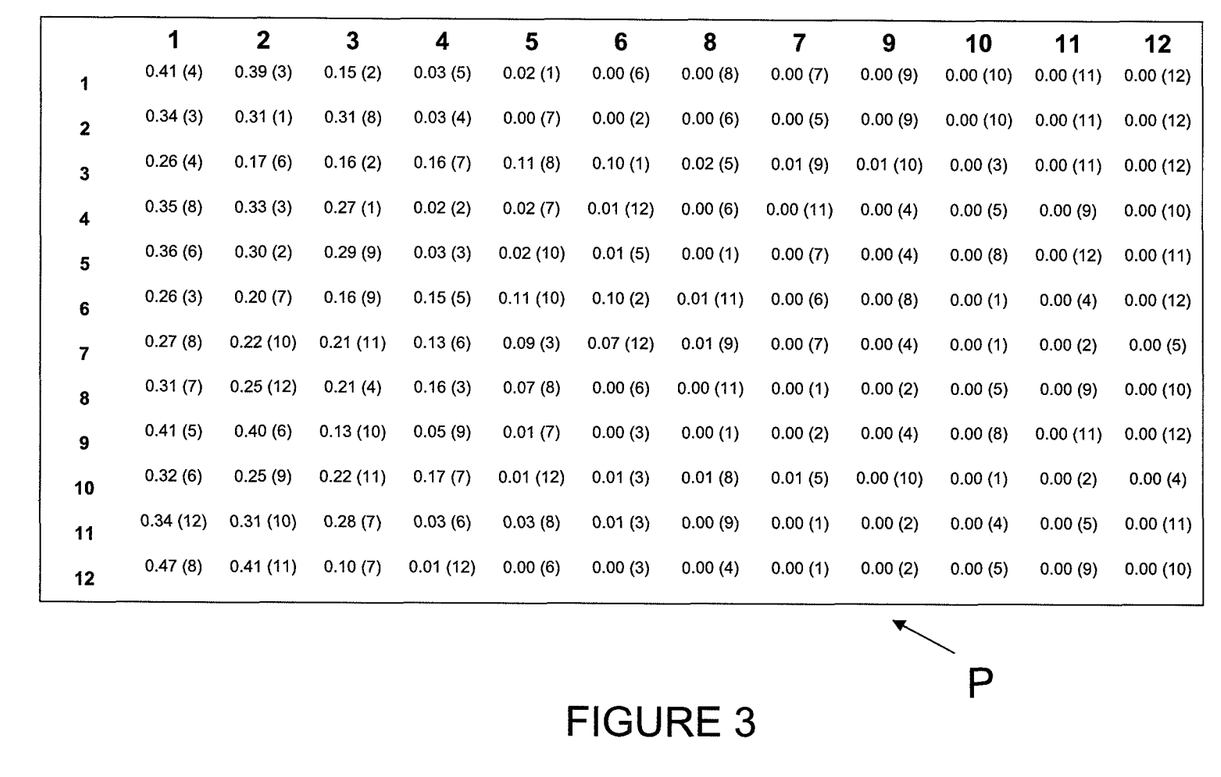
FIG. 3 is a diagram illustrating a row-wise normalized version, P, of the transition probability matrix, M.
Figure 4:
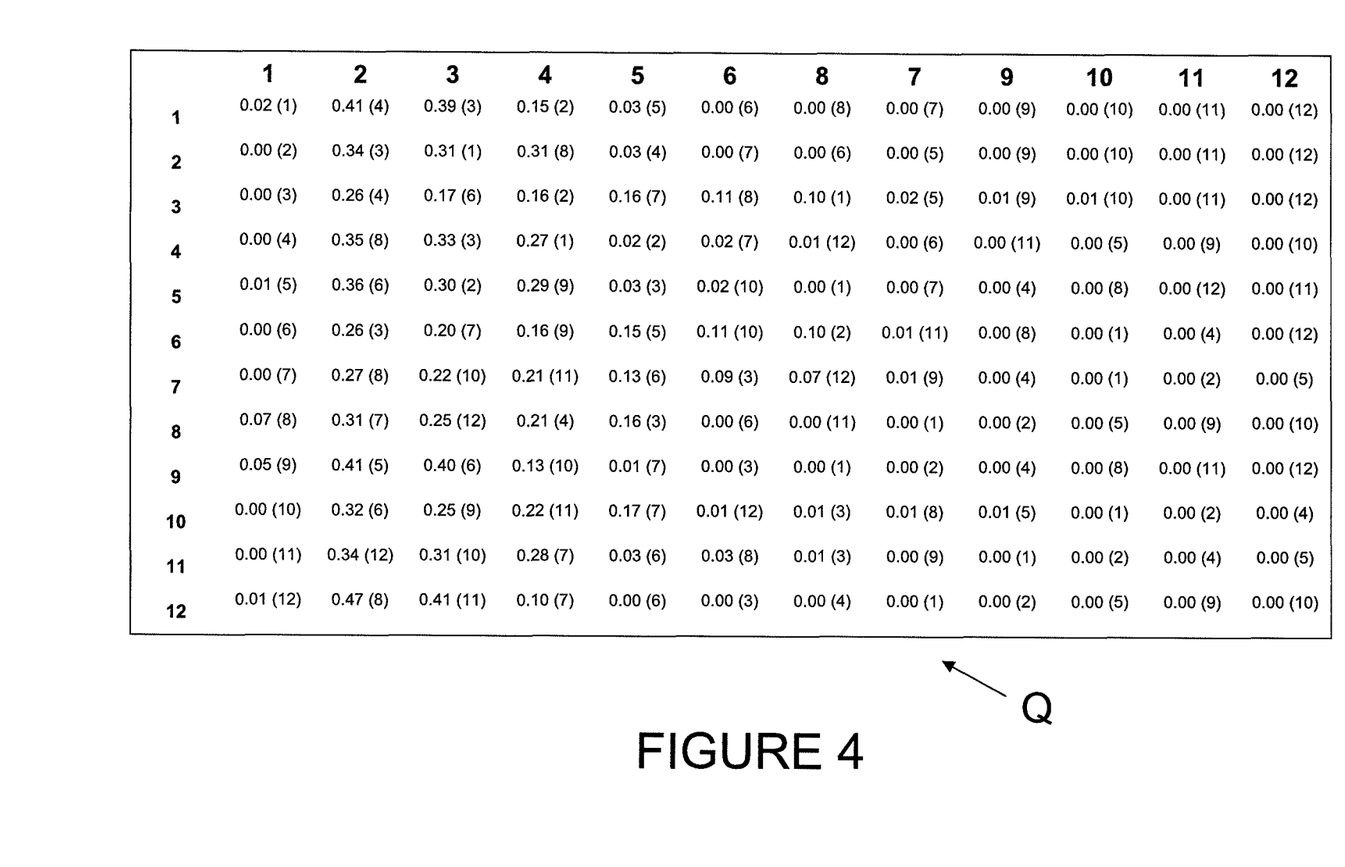
FIG. 4 is a diagram illustrating a further modified version, Q, of the transition probability matrix, M.

In accordance with the present invention, the MME maintains in a computer memory a transition probability matrix, such as transition probability matrix, M, illustrated in FIG. 2, a normalized transition probability matrix, such as normalized transition probability matrix P illustrated in FIG. 3 and an ordered transition probability matrix, such as ordered transition probability matrix Q illustrated in FIG. 4. Particularly, the transition probability matrix, M, comprises a sum of the tracking area management events count in the network. The tracking area management events, for instance, are paging events and tracking area update TAU) events. The table is updated at predetermined intervals, such as every week. The value in each cell of the matrix M corresponds to the number of UEs that have changed location from the TA represented by the corresponding row number (the most recent previous TA) to a new TA represented by the corresponding column number (the present TA). These numbers, for instance, may represent the combined sum of UE-initiated TAUs and MME initiated UE pages. For example, according to the table, 187 UEs have moved from network cell $102_6$ to network cell $102_2$, 213 UEs have moved from cell $102_8$ to cell $102_3$, 0 UEs have moved from cell area $102_5$ to cell area $102_8$, etc.

This matrix may be generated anew each interval based only on the TA tracking area management events occurring since the last update interval or may comprise a moving window compilation of data, including both the new data and the data from a predetermined number of previous intervals. The network operator may select whichever scheme it believes is likely to provide data that is better predictive of future movement of the UEs in that particular network. It may be desirable to apply an exponential weighting factor, $\lambda$, where $\lambda$ is between 0 and 1 in order to keep the numbers from becoming unnecessarily large, especially if the moving window scheme is elected, since the events counts may get rather large.

Generally, $\lambda$ should be chosen to be close to 0 when data suggests slow time varying network mobility characteristics and should be set close to 1 when data suggests fast time varying mobility characteristics in a network. Hence, assuming the use of an exponential weighting factor, the exponential weighted values filled into the cells of the transition probability matrix M can be expressed as $$m_{ij}(t)=\lambda u_{ij}(t)+(1-\lambda)m_{ij}(t-1) \text{ where } 0<\lambda<1 \quad \text{(Eq. 1)}$$

where $m_{ij}$ is the exponentially weighted value in column i, row j, $\lambda$ is the exponential weighting factor, and t is time and $u_{ij}$ is the number of UEs that have transitioned from $TA_i$ to $TA_j$ in the relevant time period t.

Note that the numbers in the diagonal of the matrix M are not all zeros because there are circumstances under which a transition might be recorded even though the UE remains in the same TA. For instance, UEs may simply periodically perform TAUs or similar reporting operations regardless of whether it has moved at all. It also should be noted that, in many if not most real world networks, statistically, a UE is probably most likely to remain within the same TA between any two time periods, which fact is not truly represented by the numbers in the matrix M.

Normalized transition probability matrix P contains the transition probability data obtained by normalizing the data in matrix M row-wise against the sum of each row. The resultant probability data (i.e., the columns) are then sorted in descending order. That is, the values in the cells of each row of matrix M are divided by the sum of all numbers in that row so that the sum of the numbers in each row of matrix P is 1 (before rounding) and the value in each cell essentially is the probability of a UE transitioning from the TA corresponding to the row number, to the TA corresponding to the column number. Then, the columns are rearranged in descending order by the probability value. In FIG. 3, there are two numbers in each cell. The first one is the aforementioned probability value. The second number (in parenthesis) is the number of the TA to which the UE transitions (i.e., the column number in matrix M from which the probability value came). For instance, the cell at row 3, column 5 in matrix P of FIG. 3 shows the probability of UE movement from TA3 to TA8 to be 0.11, which is obtained from the number in column 8 of row 3 of matrix M (198) divided by the sum of row 3 in matrix M (1879).

To further facilitate later computation, another matrix, namely, an ordered transition probability matrix Q is defined as follows:

$$Q(t) = [q_{ij}(t)]_{N \times N} \text{ where} \quad \text{(Eq. 2)}$$

$$q_{ij}(t) = \begin{cases} p_{ii}(t), \text{ if } j=1 \text{(that is put diag}(P) \text{ in } 1st \text{ column of } Q) \\ \text{else it is the } (j-1)^{th} \text{ largest element of the set} \\ \{p_{i1}(t), p_{i2}(t), \ldots, p_{iN}(t)\} \setminus \{p_{ii}(t)\} \end{cases}$$

where $q_{ij}(t)$ is the value in the cell corresponding to column i, row j for time t, and N is the number of TAs in the network, and $p_{ii}$ is the value in row i, column i, of the normalized transition probability matrix P.

Matrix Q uses the same notation as mentioned above for matrix P.

It should be noted that the conditions that $q_{ij}(t)=p_{ii}(t)$ if $j=1$ essentially is a condition that puts the diagonal values of P in the first column of Q. Essentially, the transformation of matrix P to matrix Q is nothing more than moving the cells of the diagonal of matrix M (which cells represent transitions from any given TA to the exact same TA) to the left-most column in each row with all the other cells in that row being moved rightward one column as needed to accommodate the move. This produces a matrix Q that, for each TA, lists, from left to right, the TA in which the UEs in that TA are statistically most likely to be found during the next time interval based on the past data recorded in the transition probability matrix M (and accounting for the fact that a UE is most likely to remain in the same TA even though such events normally are not recorded into the matrix M).

Furthermore, let us define a re-ordering index matrix V as follows:

$$V(t) = [v_{ij}(t)]_{N \times N} \text{ where } v_{ij} = \begin{cases} i, \text{if } j = 1 \\ k, \text{if } q_{ij}(t) = p_{ik}(t) \end{cases} \quad \text{(Eq. 3)}$$

where
$v_{ij}(t)$ is the value in row i, column j of matrix V at time t, and k is the number of TAs in the TA list.

Matrix V maps matrix Q back to matrix P.

It should be noted for a TA list of size K, the probability that a UE in TA will perform a TAU (hereinafter "TAU probability") is equal to:

$$1 - \sum_{j=1}^{K} q_{ij} = \sum_{j=K+1}^{N} q_{ij} \quad \text{(Eq. 4)}$$

If we express each row in the matrix Q as:

$$Q = \begin{bmatrix} \vdots \\ q_{i1} & q_{i2} & \cdots & q_{iK} & q_{i,K+1} & q_{i,K+2} & \cdots & q_{iN} \\ \vdots \end{bmatrix}_{N \times N} \quad \text{(Eq. 5)}$$

where K is the number of TAs in the TA list of UEs in the corresponding TA, then the TAs corresponding to the columns of $q_{i,1}, q_{i,2}, \ldots q_{i,K}$ are the TAs that should be in the TA list (since they are the K most likely TAs in which the UE will be found). On the other hand, the sum of $q_{i,K+1}, q_{i,K+2}, \ldots q_{iN}$ is the tracking area update probability.

Also, note that the TA that the UE presently resides in when the TA list is updated must be included in the TA list of the UE regardless of the size of the probability. Otherwise, a TAU would be immediately triggered. This is why the first column of matrix Q is the diagonal of matrix P.

As will be seen below, matrix Q will be used in an algorithm that derives the TA list for all UEs in a given TA that will minimize the collective network traffic for performing TAUs and UE pages.

In addition to maintaining the data on the overall paging and TAU in the network and updating the transition probability matrix accordingly as discussed above, the MME also keeps track of the number of times paging is performed and TAU is performed for each individual UE. The MME calculates a paging ratio for each UE at every data collection time interval t. The paging ratio is:

g(t)=(number of pages)/(number of TAU+small positive number) (Eq. 6)

The small positive number added to the denominator is to prevent the possibility of dividing by zero should there be no TAUs during the relevant period Thus, g varies in proportion to the size of the TA list (i.e., the number of TAs in the TA list). (Specifically, the larger the TA list, the smaller the number of TAUs performed by the UE and the larger the number pages performed by the eNBs). Optionally, an exponential weighting factor can be incorporated into the paging ratio g(t) similar to Equation 1.

Let us define two more values as follows:

$$\beta(t) = \frac{\text{real time cost of 1 } TAU \text{ event}}{\text{real time cost of 1 paging event}} \quad \text{(Eq. 7)}$$

$$r = \text{paging success rate} \quad \text{(Eq. 8)}$$

As can be seen above, $\beta(t)$ is the real time costs of a TAU event divided by the real time cost of a paging event. The network operator can define the real time cost as it desires. A reasonable definition of the real time cost of a TAU event or paging event is the average CPU load required to perform it. However, it might also be defined as the average amount of data transmitted or the average amount of network airtime consumed by such events.

The paging success rate, r, can be defined as the ratio of the number of times a page for a UE establishes contact with the UE over the total number of pages.

The exact algorithm for creating TA lists for UEs in accordance with the principals of the present invention to minimize overall total traffic for paging and TAU events will depend, of course, on the particular paging strategy used in the network. Three exemplary paging strategies reasonably designed to contact a UE in a minimum number of tries are discussed below. However, other reasonable strategies are possible also and the equations set forth herein below can be modified as needed for any other such strategies.

According to a first potential strategy, the eNB first pages only the last known TA of the specific UE. If unsuccessful, then it pages in all the TAs in the TA list of the UE.

If still unsuccessful, it retries paging in all of the TAs in the TA list of the UE up to a predetermined number of retries, $D_{max}$, with the interval between retries (hereinafter timeout period, $t_d$) increasing for each retry. For instance, the timeout period $t_d$ may be set to d seconds, where d is the number of the retry attempt, d=1, 2, ..., $D_{max}$ (i.e., for the first retry, $t_d$ is one second, for the second retry, $t_d$ is two seconds, for the third retry, $t_d$ is three seconds, and so on up to $D_{max}$ seconds for the last retry).

Alternately, according to a second potential paging strategy, all of the TAs in the TA list of the UE may be initially paged simultaneously, with retries (within the TA list) after a timeout interval of $t_d$ for the $d^{th}$ retry, where d=1, 2, ..., $D_{max}$ as described above in connection with the first paging strategy.

According to a third potential paging strategy, the UE is first paged in its last known TA. If unsuccessful, then the UE is paged in all the TAs in its TA list, with a maximum of $D_{max1}$ retries, each retry occurring d seconds after the previous retry up to $D_{max1}$ retries as previously discussed. If still unsuccessful, then the UE can be paged in all of the TAs in the network with a maximum of $D_{max2}$ retries, with each retry occurring after a $t_f$ second timeout where f is the sequence number of the retry, i.e., f=$D_{max1}$+1, $D_{max1}$+2, $D_{max1}$+3, ..., $D_{max2}$.

The traffic cost function for a UE in $TA_i$ (i.e., the TA corresponding to row i of matrix Q) for each potential TA list size for that TA may be defined as:

$$L_i^{(strategy\,k)} = \sum_{i=1}^{N}\left(\beta N_{TAU,i} + N_{page,i}^{(strategy\,k)}\right); \quad \text{(Eq. 9)}$$

$k = 1, 2, 3; i = 1, 2, \ldots, N$
where $$N_{TAU,i} = \frac{\left(1 - \sum_{j=1}^{n_i} q_{ij}\right)}{g} \text{ for a TA list of size of } n_i \quad \text{(Eq. 10)}$$

Furthermore, note the different definitions of $N_{page,i}$ for the three different strategies discussed above would be:

$$N_{page,i}^{(strategy\,1)} = 1 + \sum_{l=1}^{d_i}\left(1 - r\sum_{m=1}^{n_i} q_{im}\right)^l n_i \quad \text{(Eq. 11)}$$

$$N_{page,i}^{(strategy\,2)} = \sum_{l=0}^{d_i}\left(1 - r\sum_{m=1}^{n_i} q_{im}\right)^l n_i \quad \text{(Eq. 12)}$$

$$N_{page,i}^{(strategy\,3)} = 1 + \sum_{l=1}^{d1_i}\left(1 - r\sum_{m=1}^{n_i} q_{im}\right)^l n_i + \sum_{l=d1_i+1}^{d2_i}\left(1 - r\sum_{m=1}^{n_i} q_{im}\right)^l N \quad \text{(Eq. 13)}$$

Thus, in order to minimize overall network traffic for paging and TAU events, we select the TA list size, $n_i$, for each individual TA (i.e., each row of matrix Q) that yields the smallest value for the traffic cost function, $L_i$, i.e., $$n_i^{(strategy\,k)*} = \min_{\substack{n_i \in \{1,2,\ldots,N\} \\ target}} L_i^{(strategy\,k)} \quad \text{(Eq. 14)}$$

If desired, $n_i$ can be constrained by any further conditions desired. For instance, it may be desirable to select the TA list size, $n_i$, with the lowest traffic cost function, $L_i$, that still meets some predetermined minimum average paging success rate, $S_{target}$ and/or such that the average number of paging retries, $D_i$, will be less than a predetermined number $D_{max}$, eg., $$n_i^{(strategy\,k)*} = \min_{\substack{n_i \in \{1,2,\ldots,N\} \\ \text{such that } d_i \leq D_{target} \\ \text{and avg paging success rate} \geq S_{target}}} L_i^{(strategy\,k)} \quad \text{(Eq. 15)}$$

Equation 10 is the traffic cost function and is calculated for each value of i from 1 up to N, where N is the total number of TAs in the network. The term $N_{TAU}$ in equation 10 is the average real time cost of a TAU event. The factor β, as previously described in connection with equation 7, is a normalization factor that normalizes the TAU cost to the paging event cost. The term $N_{page}$ in equation 10 is the real time cost of a paging event on the network. $N_{page}$ is calculated differently depending on the particular paging strategy selected for the network. As mentioned above, three exemplary paging strategies were disclosed and the algorithm for calculating $N_{page}$ for each strategy is shown above in equations 11, 12, and 13, respectively.

Accordingly, the traffic cost function, L, derived for each possible TA list size is calculated as the sum of the paging cost function $N_{page}$ and the normalized TAU cost function $\beta N_{TAU}$ for the given TA list size, $n_i$.

For sake of clarity, the following definitions relevant to equations 10-14 are provided:
$L_i$ is the traffic cost function for a list of size i;
i is the TA number;
K is the exemplary paging strategy number;
$d_i$ is the delay bound target, i.e., the average number of retries for the paging strategy;
r is the paging success rate as discussed above in connection with Equation 11-13;
$q_{ij}$ is the data point in row i, column j of the matrix Q;
$q_{im}$ is the data point at row i, column m in the matrix Q.;
g is the paging ratio at data collection time t for the particular UE being considered as defined in Equation 6;
$n_i$ is the TA list size (for $TA_i$).

Figure 5:
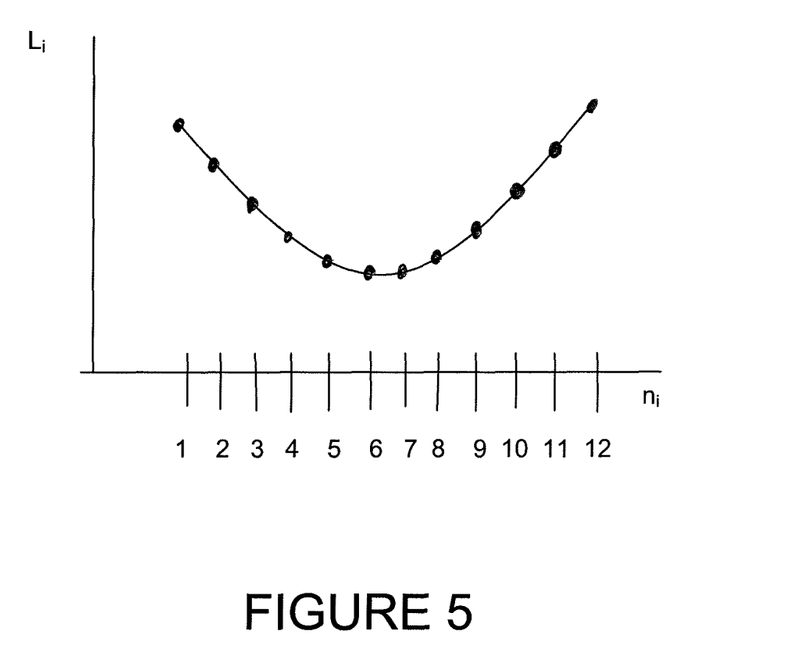
FIG. 5 is a graph illustrating how the cost function, $L_i$, normally changes as a function of the number of TAs in the TA list, $n_i$, in accordance with the principles of the present invention.

The traffic cost function $L_i$ as a function of the number of TAs in the TA list, $n_i$, normally graphs as a U shape, as shown in FIG. 5. That is, the traffic cost function will decrease as the number of TAs in the TA list increases from 1 up to some number and then will start increasing as the number of TAs in the TA list increases further. Hence, generally the best value for $n_i$ (i.e. the number of TAs to put in the TA list of UEs in a given TA), may be defined as the largest $n_i$ for which $L_i(n_i) - L_i(n_i-1)$ is less than or equal to zero. Thus, one efficient way to find the value $n_i$ resulting in the lowest cost function is to generate an equation that combines this condition with Equation 9.

The following shows the derivation of such an equation substituting Equation 10 and Equation 11 (i.e., assuming paging strategy number 1) into Equation 9, assuming the number of retries is limited to one, ie. $D_{max}=1$, and having no constraint on average paging success rate.

$$L^{(1)} = \sum_{i=1}^{N}\left\{\frac{\beta}{g}\left(1 - \sum_{j=1}^{n_i} q_{ij}\right) + n_i + \left(1 - r\sum_{j=1}^{n_i} q_{ij}\right)N\right\}$$

Find max $n_i$ for which $L^{(1)}_i(ni) - L^{(1)}_i(ni-1) \leq 0$ for each i $$\frac{\beta}{g}\left(1 - \sum_{j=1}^{n_i} q_{ij}\right) + n_i + \left(1 - r\sum_{j=1}^{n_i} q_{ij}\right)N \quad \text{(Eq. 18)}$$

$$\frac{\beta}{g}\left(1 - \sum_{j=1}^{n_i-1} q_{ij}\right) + n_i - 1 + \left(1 - r\sum_{j=1}^{n_i-1} q_{ij}\right)N$$

$$-\frac{\beta}{g}q_{in_i} + 1 - rq_{in_i}N \leq 0$$

$$1 \leq \left(\frac{\beta}{g} + rN\right)q_{in_i}$$

$$q_{in_i} \geq \frac{1}{\frac{\beta}{g} + rN}$$

Thus, as one moves from left to right in any row i of matrix Q, the last row for which equation 16 is true yields not only the desired TA list size for a particular UE, i.e., $n_i$, but also the specific TAs that comprise the list, i.e., the TAs corresponding to columns j=1 to column j=$n_i$ of row i.

Figure 6:
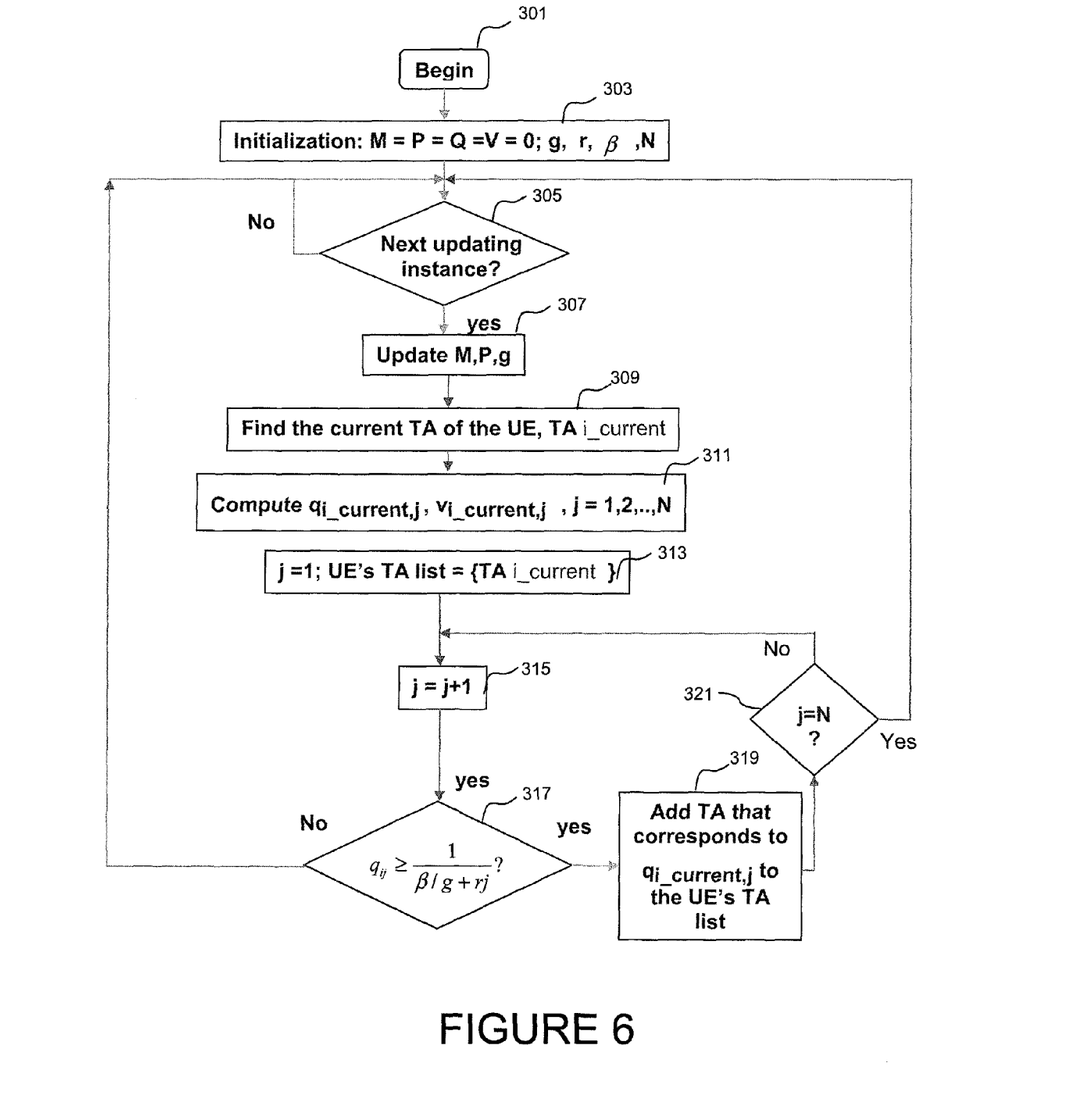
FIG. 6 is a flow chart illustrating operation in accordance with one embodiment of the present invention.

FIG. 6 is a flow chart illustrating operation to construct a TA list for a UE in a given TA for the following conditions: (1)

paging strategy 1, (2) $D_{max}$ set to one retry, and (3) no minimum average paging success rate constraint. This flow chart represents the process in determining the number of TAs in the TA list as well as the specific TAs to put in that list for a single UE. The process would be performed for each UE in the network as indicated.

The MME starts the process at step 301. In step 303, the MME initializes the matrices M, P, Q, and V to zero. It also will need for purposes of the procedure, values for (1) the paging ratio, g, (2) the paging success rate, r, (3) the weighting factor β, for weighting the real time cost of a TAU event as compared to a paging event, and (4) the number, N, of TAs in the network served by the MME. The values of β and N generally are fixed values as they typically only change when the operator reconfigures the network. However, g and r change over time and should be calculated at each interval by the MME. Each UE will have a unique g. Merely as a few examples, initialization of the matrices and other parameters, i.e., steps 301 and 303, may be performed (1) at predetermined intervals during the operation of the network (e.g., once a week or once a month), (2) only upon start up of the network and upon the occurrence of special events (e.g., the Olympics are being held in the locality serviced by the network), or (3) only once upon start up of the network (e.g., especially if an exponential weighting function is employed)

Next, in step 305 it is determined if it is time to perform the next update of the TA lists of a UE. The update instance can be virtually anything. Typically, whenever the MME receives a TAU event from a UE, it will update that UE's TA list. So each TAU performed by a UE would trigger such an instance. However, the MME also may update the TA lists of UEs responsive to other criteria, such as (1) the expiration of some period since the last TA list update for that UE, (2) a predetermined time at which all UEs are updated, (3) special occasions, etc. In any event, whatever the triggering instances are, if one has not occurred, the system simply waits for one to occur. When a triggering instance occurs, flow proceeds to step 307, where all tracking area management event data (e.g., TAUs and pages) since the last update are factored in to update the matrices M and P as well as the paging ratio g for that UE.

Next, in step 309, the MME finds the TA in which the UE is located, $TA_{i\_current}$. In step 311, the row of each of matrices Q and V is updated. Particularly, values for $q_{i\_current,\ j}$ and $v_{i\_current,j}$ are calculated for j=1, 2, ..., N.

With the row i of the matrix Q corresponding to the selected TA now updated, the TA list to use for the UEs in this TA can be determined. Thus, in step 313, the column number j is set to 1, which guarantees that the TA list will include the selected TA itself (since, according to the definition of matrix Q, the first column of matrix Q corresponds to the same TA, $TA_{i\_current}$). Next, in step 315, j is set to j+1.

In step 317, the value for $q_{i\_current,j}$ (as determined in step 311) is compared to the value generated by Equation 16. If $q_{i\_current,\ j}$ is greater than or equal to that value, it means that $L_i$ as a function of the number of TAs in the TA list, $n_i$, is still decreasing and, therefore, the TA corresponding to column j in row icurrent of the matrix Q should be added to the TA list. Specifically, because the columns in row i of matrix Q are arranged in descending order by likelihood of finding a UE previously found in $TA_{i\_current}$ in $TA_j$, we can simply add the TAs corresponding to the columns in row i_current of matrix Q to the TA list in order from left to right. Accordingly, flow will proceed from step 317 to step 319 where the TA that corresponds to a $q_{i\_current,\ j}$ is added to the TA list for the $TA_{i\_current}$. On the other hand, if $q_{i\_current,\ j}$ is less than the value calculated by Equation 16, then the cost function $L_i$ is increasing as a function of adding more TAs to the TA list, which means that the TA list is finished and flow would instead proceed from step 317 back to step 305 to await the next updating instance.

Returning to step 319, when the TA corresponding to $q_{i\_current,j}$ is added to the list in step 319, flow proceeds to step 321 where it is determined if the last column of a row i_current has been reached. If not, flow returns through steps 315-319 to determine if another TA should be added to the TA list. If so, the TA list is finished and flow returns to step 305 to await the next update instance to occur The scheme described herein can be implemented at the MME and requires no assistance from other nodes (except for the receipt of the traffic data and the transmission of the TA lists to the other nodes of the network). Furthermore, the algorithm itself is computationally simple with low memory requirements, which, when combined with the reduced signaling traffic level achievable, implies an even greater capacity improvement for the MME.

Furthermore, while the invention has been described in connection with a 3GPP LTE network, the principles set forth herein are applicable to any network comprising a plurality of sub-areas in which a mobile node may be paged by a base node.

The processes described above may be implemented by any reasonable circuitry, including, but not limited to, computers, processors, microprocessors, digital signal processors, state machines, software, firmware, hardware, analog circuits, digital circuits, field programmable gate arrays, combinational logic circuitry, or any combination of the above, including a computer or other processor running software stored on any computer readable medium, including, but not limited to, compact disc, digital versatile disk, RAM, ROM, PROM, EPROM, EEPROM, and magnetic tape. The data to be stored at the MME or elsewhere in accordance with this invention may be stored in any reasonable computer memory, including any of the aforementioned forms of computer memory.

The flow could be largely the same for other paging strategies and/or constrains, except that the equation in step 317 would need to be modified in accordance with the particular paging strategy and/or constraints.

Having thus described a few particular embodiments of the invention, alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only and not limited. The invention is limited only as defined in the following claims and equivalents thereto.

The invention claimed is:

1. A method of building a tracking area list for a user equipment in a network having a plurality of tracking areas and a plurality of user equipments capable of being moved between tracking areas of the network, comprising:
   maintaining in a computer memory data disclosing a frequency of tracking area management events of user equipments between every pair of tracking areas of the network over a time period, the tracking area management events comprising paging events and tracking area update events;
   receiving relative cost data of real time costs of a paging event relative to real time costs of a tracking area update event in the network, the real time costs being defined by a network operator, wherein the real time costs comprise an average load required to perform a paging event or a tracking area update event;

determining, using a processor, a ratio of paging event to tracking area update event in the network for at least one user equipment;

predicting, using a processor, based on the frequency data, the relative cost data, and the ratio data, a number of tracking areas, n, to include in a tracking area list for the at least one user equipment, which number predictively reduces a sum cost of paging events and tracking area update events in the network; and constructing, using a processor, a tracking area list for the at least one user equipment having n tracking areas.

2. The method of claim 1 wherein the predicting comprises calculating the number, n, of tracking areas to include in the tracking area list separately for each individual user equipment.

3. The method of claim 2, wherein the network further comprises a Mobility Management Entity (MME) and wherein the maintaining, receiving relative cost data, determining the ratio, predicting, and constructing are performed at an MME.

4. The method of any of the claim 2 wherein the constructing comprises, for each individual user equipment, placing in the tracking area list at least the n−1 tracking areas having the highest frequency of tracking area management events from the tracking area in which the corresponding user equipment is currently located to another tracking area.

5. The method of any of claim 4 wherein the constructing further comprises, for each individual user equipment, placing the tracking area in which the individual/user equipment is currently located in its own tracking area list.

6. The method of claim 5, wherein the constructing comprises:

building a matrix comprising N rows and N columns, wherein N is the number of tracking areas in the network, each row corresponding to a previous tracking area in which a user equipment was located and each column corresponding to a current tracking area in which a user equipment is located;

placing in each cell of the matrix a value corresponding to a number of tracking area management events of user equipment from the tracking area of the corresponding row to the tracking area of the corresponding column;

ordering each row so that the column corresponding to the same tracking area as the tracking area to which the row corresponds is first and is followed by all other columns in descending order as a function of the values in the cells of the matrix.

7. The method of claim 6 wherein the constructing comprises placing in each tracking area list the tracking areas corresponding to the first n columns of the row corresponding to the tracking area in which the corresponding user equipment is currently located.

8. The method of claim 2 wherein the calculating the number n comprises, for each user equipment, determining the number of tracking areas i that yields the lowest value for $L_i$ using the equation:

$$L_i = \sum_{i=1}^{N} (\beta N_{TAU,i} + N_{page,i}); i = 1, 2, \ldots, N$$

where $\beta$ is the ratio;

i is the individual tracking area in which the corresponding user equipment is currently located;

j is a tracking area to which user equipment may transition from tracking area i;

N is the number of tracking areas of the network;

$N_{TAU, i}$ is a traffic cost function of tracking area update events for the corresponding user equipment as a function of $n_i$; and $N_{page, i}$ is a traffic cost function of paging events for individual tracking area i.

9. The method of claim 6, wherein $$L_i = \sum_{i=1}^{N} (\beta N_{TAU,i} + N_{page,i}); i = 1, 2, \ldots, N$$

where $\beta$ is the ratio;

i is the individual tracking area in which the corresponding user equipment is currently located;

j is a tracking area to which user equipment may transition from tracking area i;

N is the number of tracking areas of the network;

$N_{TAU, i}$ is a traffic cost function of tracking area update events for the corresponding user equipment as a function of $n_i$; and $N_{page, i}$ is a traffic cost function of paging events for individual tracking area i;

$$N_{TAU,i} = \frac{\left(1 - \sum_{j=1}^{n_i} q_{ij}\right)}{g} \text{ for a TA list of size of } n_i$$

where g is said ratio of paging events to tracking area update events; and $q_{ij}$ is the data disclosing the frequency of tracking area management events from tracking area i to tracking area j, where tracking area j is the tracking area corresponding to the $j^{th}$ column of row i of the matrix.

10. The method of claim 9 wherein calculating the number n for each individual user equipment further comprises selecting the value n for which $L_i$ is the lowest value that maintains a predetermined paging success ratio.

11. The method of claim 9 wherein $N_{page, i}$ is a function of a particular paging strategy used in the network.

12. The method of claim 9 wherein $N_{page, i}$ is selected from the set comprising:

$$N_{page,i}^{(strategy\ 1)} = 1 + \sum_{l=1}^{d_i} \left(1 - r\sum_{m=1}^{n_i} q_{im}\right)^l n_i$$

$$N_{page,i}^{(strategy\ 2)} = \sum_{l=0}^{d_i} \left(1 - r\sum_{m=1}^{n_i} q_{im}\right)^l n_i$$

-continued $$N_{page,i}^{(strategy\ 3)} = 1 + \sum_{l=1}^{d1_i}\left(1 - r\sum_{m=1}^{n_i} q_{im}\right)^l n_i + \sum_{l=d1_i+1}^{d2_i}\left(1 - r\sum_{m=1}^{n_i} q_{im}\right)^l N$$

where r is a predetermined paging success ratio; and $q_{imj}$ is the data disclosing the frequency of tracking area management events from tracking area i to tracking area m, where tracking area m is the tracking area corresponding to the $m^{th}$ column of row i of the matrix.

13. The method of claim 12 wherein the frequency data is occasionally reset to zero.

14. The method of claim 12 wherein the frequency data is exponentially weighted.

15. A computer program product embodied on a non-transitory computer readable medium for building a tracking area list in a network having a plurality of tracking areas and a plurality of user equipments capable of being moved between tracking areas of the network comprising:

computer executable instructions for maintaining data disclosing a frequency of tracking area management events of user equipment between every pair of tracking areas of the network over a time period, the tracking area management events comprising paging events and tracking area update events;

computer executable instructions for receiving relative cost data of real time costs of a paging event relative to real time costs of a tracking area update event in the network, the real time costs being defined by a network operator, wherein the real time costs comprise an average load required to perform a paging event or a tracking area update event;

computer executable instructions for determining a ratio of paging event to tracking area update event for at least one user equipment;

computer executable instructions for predicting, based on the frequency data, the relative cost data, and the ratio data, a number of tracking areas, n, to include in a tracking area list for the at least one user equipment, which number predictively reduces a sum cost of paging events and tracking area update events in the network; and computer executable instructions for constructing a tracking area list for the at least one user equipment having n tracking areas.

16. The computer program product of claim 15 wherein the computer executable instructions for constructing comprises computer executable instructions for placing in the tracking area list at least the n–1 tracking areas having the highest frequency of tracking area management events from the tracking area in which the at least one user equipment is currently located to another tracking area.

17. The computer program product of claim 16 wherein the computer executable instructions for constructing further comprises computer executable instructions for placing the tracking area in which the at least one user equipment is currently located in its own tracking area list.

18. The computer program product of claim 16 wherein the computer executable instructions for constructing comprises:

computer executable instructions for building a matrix comprising N rows and N columns, wherein N is the number of tracking areas in the network, each row corresponding to a previous tracking area in which a user equipment was located and each column corresponding to a current tracking area in which a user equipment is located;

computer executable instructions for placing in each cell of the matrix a value corresponding to a number of tracking area management events of user equipment from the tracking area of the corresponding row to the tracking area of the corresponding column;

computer executable instructions for ordering each row so that the column corresponding to the same tracking area as the tracking area to which the row corresponds is first and is followed by all other columns in descending order as a function of the values in the cells of the matrix.

19. The computer program product of claim 18 wherein the computer executable instructions for constructing comprises computer executable instructions for placing in the tracking area list the tracking areas corresponding to the first n columns of the row corresponding to the individual tracking area.

20. The computer program product of claim 15 wherein the computer executable instructions for calculating the number n comprises computer executable instructions for determining the number of tracking areas i that yields the lowest value for $L_i$ for the at least one user equipment, using the equation:

$$L_i = \sum_{i=1}^{N}(\beta N_{TAU,i} + N_{page,i});\ i = 1, 2, \ldots, N$$

β is the ratio:

i is the individual tracking area in which the at least one user equipment is currently located;

j is a tracking area to which user equipment may transition from individual tracking area i;

N is the number of tracking areas of the network;

$N_{TAU,\ i}$ is a traffic cost function of tracking area update events for user equipment in tracking area i as a function of $n_i$; and $N_{page,\ i}$ is a traffic cost function of paging events for individual tracking area i.

21. The computer program product of claim 18 wherein the computer executable instructions for calculating the number n comprises computer executable instructions for determining the number of tracking areas i that yields the lowest value for $L_i$ in the equation:

$$L_i = \sum_{i=1}^{N}(\beta N_{TAU,i} + N_{page,i});\ i = 1, 2, \ldots, N$$

where

β is the ratio;

i is the individual tracking area in which the corresponding user equipment is currently located;

j is a tracking area to which user equipment may transition from tracking area i;

N is the number of tracking areas of the network;

$N_{TAU,\ i}$ is a traffic cost function of tracking area update events for the corresponding user equipment as a function of $n_i$; and $N_{page,\ i}$ is a traffic cost function of paging events for individual tracking area i;

$$N_{TAU,i} = \frac{\left(1 - \sum_{j=1}^{n_i} q_{ij}\right)}{g} \text{ for a } TA \text{ list of size of } n_i$$

where
- g is said ratio of paging events to tracking area update events; and
- $q_{ij}$ is the data disclosing the frequency of tracking area management events from tracking area i to tracking area j, where tracking area j is the tracking area corresponding to the $j^{th}$ column of row i of the matrix.

* * * * *